US012258163B2

(12) United States Patent
Ponti

(10) Patent No.: US 12,258,163 B2
(45) Date of Patent: Mar. 25, 2025

(54) PACKAGING MACHINE WITH STATION FOR FOLDING AND CLOSING A PREFORMED CARTON AND METHOD THEREFOR

(71) Applicant: C.M.C. S.P.A., Città di Castello (IT)

(72) Inventor: Lorenzo Ponti, Città di Castello (IT)

(73) Assignee: C.M.C. S.P.A., Città di Castello (IT)

( * ) Notice: Subject to any disclaimer, the term of this patent is extended or adjusted under 35 U.S.C. 154(b) by 55 days.

(21) Appl. No.: 17/801,320

(22) PCT Filed: Mar. 4, 2021

(86) PCT No.: PCT/IB2021/051815
§ 371 (c)(1),
(2) Date: Aug. 22, 2022

(87) PCT Pub. No.: WO2021/181222
PCT Pub. Date: Sep. 16, 2021

(65) Prior Publication Data
US 2023/0082521 A1 Mar. 16, 2023

(30) Foreign Application Priority Data
Mar. 9, 2020 (IT) ........................ 102020000005005

(51) Int. Cl.
*B65B 5/02* (2006.01)
*B65B 7/20* (2006.01)
(Continued)

(52) U.S. Cl.
CPC ................ *B65B 5/024* (2013.01); *B65B 7/20* (2013.01); *B65B 35/56* (2013.01); *B65B 51/026* (2013.01);
(Continued)

(58) Field of Classification Search
CPC .................................. B65B 5/024; B65B 7/20
See application file for complete search history.

(56) References Cited

U.S. PATENT DOCUMENTS 4,503,659 A * 3/1985 Sherman ............... B65B 51/023 53/376.5
10,543,945 B2 * 1/2020 Sytema ................... B65B 5/024
(Continued)

FOREIGN PATENT DOCUMENTS

EP 2236425 A1 * 10/2010 ........... B65B 51/023
EP 2236425 B1 12/2011
EP 3464074 B1 * 11/2019 ............. B31B 50/00

OTHER PUBLICATIONS

International Search Report and the Written Opinion of the International Searching Authority, issued in corresponding International Application No. PCT/IB2021/051815, dated Apr. 14, 2021, 9 pages.

*Primary Examiner* — Lucas E. A. Palmer
(74) *Attorney, Agent, or Firm* — Rothwell, Figg, Ernst & Manbeck, P.C.

(57) ABSTRACT

Machinery for packaging articles (15, 15') in preformed cartons (18), having a conveyor (19) for making cartons travel with an article resting on top of the carton, partially enclosed by the carton, comprising a closing station, in particular having first folding means (24) designed to lift a first side wall of the said carton arranged transversely to the carton progress direction (A) so that it is positioned against the article, in particular towards the rear of the article with respect to the carton progress direction, characterised by the fact that said closing station may be moved parallel to the carton progress direction, wherein the closing station is integral to a sliding surface (20) which is parallel to the surface (26) of the machine on top of which the cartons travel. Packaging method using a machine as described above.

6 Claims, 4 Drawing Sheets

(51) Int. Cl.

| | |
|---|---|
| ***B65B 35/56*** | (2006.01) |
| ***B65B 51/02*** | (2006.01) |
| ***B65B 57/06*** | (2006.01) |
| *B31B 100/00* | (2017.01) |

(52) U.S. Cl.

CPC .......... *B65B 57/06* (2013.01); *B31B 2100/00* (2017.08); *B65B 2210/04* (2013.01)

(56) References Cited

U.S. PATENT DOCUMENTS

| | | | | |
|---|---|---|---|---|
| 10,836,517 | B2 * | 11/2020 | Ponti | B65D 5/443 |
| 2015/0027086 | A1 * | 1/2015 | Adams | B65B 43/265<br>53/410 |
| 2015/0031519 | A1 * | 1/2015 | Cavazza | B65B 11/004<br>493/441 |
| 2015/0360433 | A1 * | 12/2015 | Feijen | B31B 50/74<br>493/162 |
| 2020/0031506 | A1 * | 1/2020 | Ponti | B65B 49/08 |

* cited by examiner

PACKAGING MACHINE WITH STATION FOR FOLDING AND CLOSING A PREFORMED CARTON AND METHOD THEREFOR

CROSS REFERENCE TO RELATED APPLICATION(S)

This application is a 35 U.S.C. § 371 National Phase Entry Application from PCT/IB2021/051815, filed Mar. 4, 2021, designating the United States, and also claims the benefit of Italian Application No. 102020000005005, filed Mar. 9, 2020, the disclosures of which are incorporated herein by reference in their entirety.

The present invention relates to a packaging machinery comprising a station for folding and closing a preformed carton and a method for folding and closing the carton.

Cartons of various types which are suitable for packaging and effectively protecting the articles are commonly known. A particularly advantageous example from these points of view is described in application EP 3 093 246 A1 filed in the name of the Applicant. The said carton can be made to measure for the individual articles by packaging machinery equipped with means for measuring the articles to be packaged, cutting and scoring the cartons, in particular starting from a continuous cardboard web (reel or fan-folded, or produced in any commonly known way), means for creating dies, for positioning the articles on the cartons once suitably folded and glued, and for subsequent closing the said cartons around the articles. Cutting and creasing are carried out according to the measurements of the article, which are taken using appropriate means, and the article is placed on the cut and folded carton, which is subsequently closed up around the article through further folding and gluing operations. Human involvement is limited to the loading of individual articles onto a conveyor belt of the machine.

Machinery of this kind is described in applications EP 3 463 844 A1, EP 3 464 085 A1, and EP 3 464 086 A1 and in patents EP 3 464 074 B1 and EP 3 464 073 B1, filed in the name of the Applicant, which concern various solutions suitable therefor.

In particular, documents EP 3 464 086 A1 and EP 3 464 074 B1 describe, respectively, a folding station and a closing station expressly designed for packaging an article with a carton according to EP 3 093 246 A1. These folding and closing stations require the article to be mutually stationary with the machine during processing at these stations. The carton and the article to be packaged are moved by a conveyor unit which usually comprises a conveyor belt, on top of which the bottom of the carton rests, and which feeds it along the machine. Therefore, in existing machinery, several independent sections of the said conveyor belt are featured, in particular: a section coming from a first folding zone of the folding station, where the side closing walls and the folding tabs (which must be glued to the upper part of the carton) are folded around the article to be packaged, as well as the application of glue to the said tabs; in this section, the carton progresses and the gluing and folding means act in cooperation with the feeding of the carton, which does not stop here; a second section corresponding to the second folding zone, during whose processing (enclosing the article by means of a third side wall and upper part) the carton must be kept mutually stationary with the said zone. Finally, a further section corresponding to the closing station, where a carton stop is also required and where the carton is lifted and glue is applied to a wall of the carton, behind the article with respect to the carton feed direction. This requires a prolonged stop. The independent conveyor belt sections allow other cartons to move in other parts of the machine, including therein during stops during these stages. However, in the most advanced machines of this kind, with high operating speeds during the other stages, the need to stop the carton, especially in the closing station, constitutes a notable limit to the hourly productivity that can be achieved.

The drawbacks set out above have now been overcome, according to the present invention, by means of a machine for packaging articles in preformed cartons, having a conveyor for feeding cartons with an article resting on top of and partially enclosed by the carton, the said machine comprising a closing station, in particular having first folding means designed to lift a first side wall of the said carton so that it is positioned against the article, the said side wall being arranged transversely to the carton feed direction, in particular behind the article with respect to the carton feed direction, characterised by the fact that the said closing station may be moved parallel to the carton feed direction.

According to a preferred aspect, the closing station also has means of applying adhesive to the said side wall, which are in particular coupled with the first folding means; according to a further aspect, the said station comprises second folding means designed to press a closing flap against the said side wall.

According to a further aspect, the machine also comprises a folding station having a folding zone comprising third folding means designed to lift a second side wall of the carton opposite the first—and more specifically arranged in front of the article with respect to the carton feed direction—against the article and to fold an upper wall hinged onto the second side wall over the article, wherein the said folding zone may be moved parallel to the carton feed direction.

The invention also relates to a method for packaging articles in cartons comprising the following steps:

- feeding of the cartons containing a partially enclosed article in a feed direction by means of a conveyor;
- gripping of the carton by folding means and, optionally, application of adhesive by a closing station;
- moving of the closing station during the gripping phase in the carton feed direction, so that the carton being fed and the station are in a mutually stationary position;
- release of the closed carton by the said means;
- movement of the closing station in the opposite direction to the carton feed direction in order to bring the said station back to the original position.

The invention will now be better described by illustrating preferred embodiments, provided by way of example, without limiting the scope of protection of the patent and with particular reference to the figures, in which.

Figure 1:
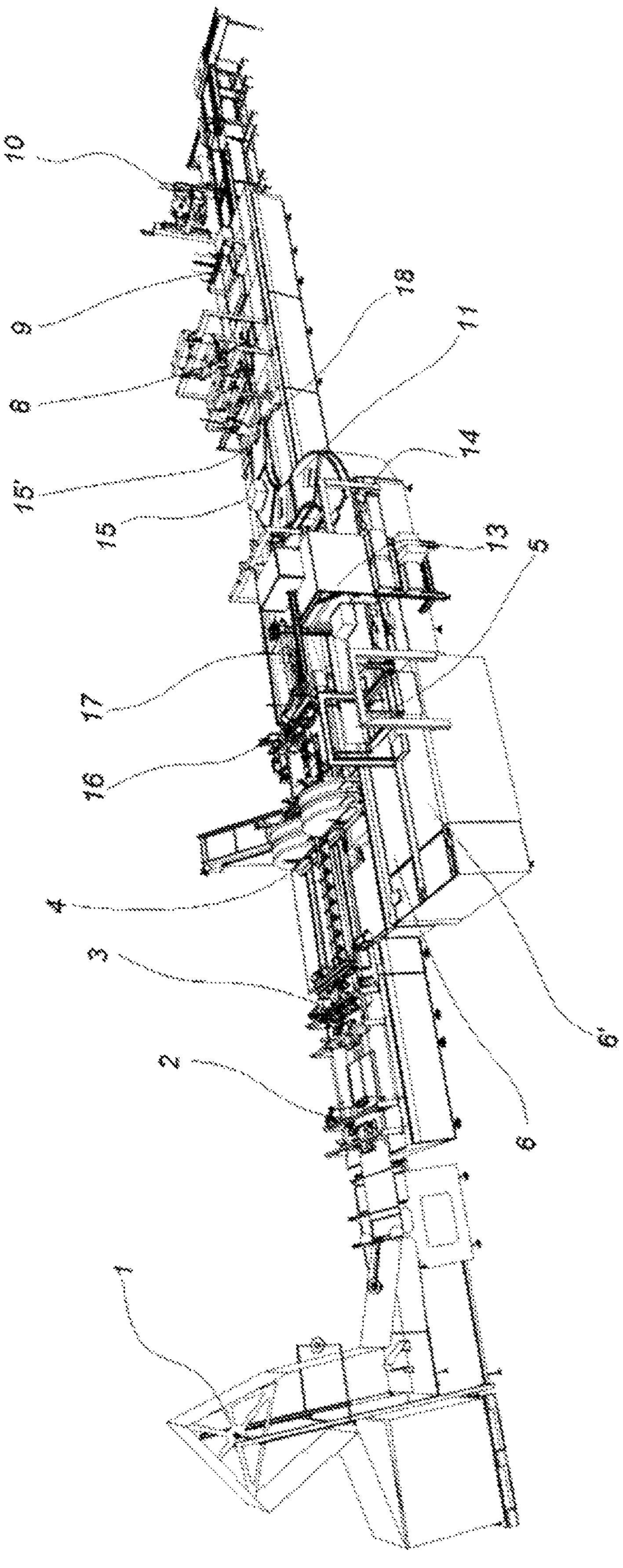
FIG. 1 shows, schematically, a perspective view of a machine for the formation of cartons and for the packaging of articles, according to the present invention, as a whole.

A machine according to the invention is shown in FIG. 1.

In this machine, a cardboard web 1 is fed by commonly known means, as a reel or fan-folded or made in another suitable way, for example as described in applications EP 3 529 050 or IT 102018000009606. A first cutting station 2 separates a rectangular portion from the web, for the creation of a carton following further formation steps. The carton proceeds on a suitable conveyor (of a commonly known kind) and reaches a creasing station 3 designed to create suitable creases, both longitudinally and transversely to the carton feed direction. A second cutting station 4 is designed to perform a series of notches. According to a preferred aspect of the invention, the said cutting station may be made, for example, according to the teachings of EP 3 464 073 A1. According to a further aspect, this solution may be modified by doubling the number of cutting units. In this way, the transversal cuts, on the transversal creases of the carton produced according to this document, could be made in a single step instead of two, eliminating the need to slow down or stop the carton during the formation thereof. Obviously, it should be made possible to space the various cutting units at the same time in a suitable way, so that they are positioned over the creases at the same time.

This is followed by a gluing station 16, where the glue is applied in a suitable position, and a folding station 17. The folding station may be similar to that described in one of the applications mentioned above, or it may be made so that it closes up all the reinforcing and closing flaps and then reopens the side closing flaps with suitable reopening means. This makes it possible to create a much simpler folding station, which does not require the carton to make stops on the conveyor. The carton reaches position 7, where the article to be packaged 15, 15' is placed with the reinforcement flaps glued onto the central portion and the side closing flaps open, to allow placement of the article.

The article can come from a loading station comprising one or more loading belts 6, 6', onto which articles may be loaded by operators. In the case exemplified, there are two loading belts. The articles on the second belt are pushed by suitable means 5 onto the first belt, alternating them with those loaded directly onto the first belt. A measuring structure 13 measures the position and dimensions of the article. This data is used to size the carton according to the dimensions of the article. An alignment system 14 appropriately centres the article, which moves onto a conveyor belt 35 that places it on the preformed carton at point 7. The loading and placement of the article can also take place in another commonly known way.

After the article has been placed on the carton, the carton reaches a further folding (and gluing station) 8 and a final closing station 9. The latter can be followed by further processing stations 10, for example for labelling.

The carton, as said, can be made, for example, as described in EP 3 093 246 A1. However, the machinery and the method according to the present invention are not limited to application to this type of carton, but can also be used with other types of carton that have suitable characteristics.

Figure 2:
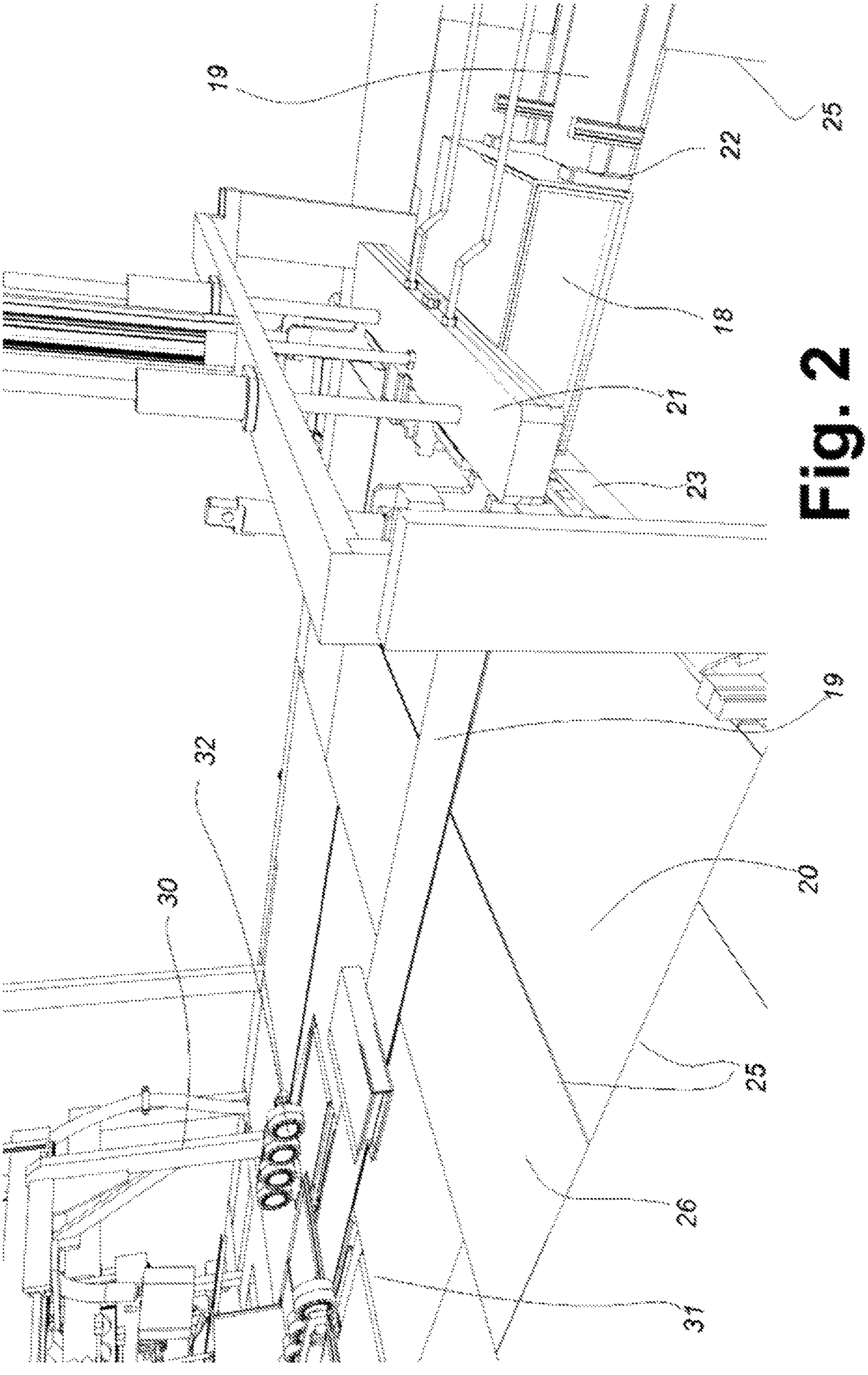
FIG. 2 shows, schematically, a closing station during the closing and gluing of a carton.

With reference to FIG. 2, one can observe a carton 18 moved by a suitable conveyor 19 (of a commonly known type), for example a conveyor belt located underneath the carton, which moves it by friction.

The carton encloses the article to be packaged.

The second folding means 21 (lowered onto the carton) are visible, as are the stop means 22, which hold the carton in position with respect to the folding station. A transverse opening 23 is also visible on the first movable sliding surface 20.

Figure 4:
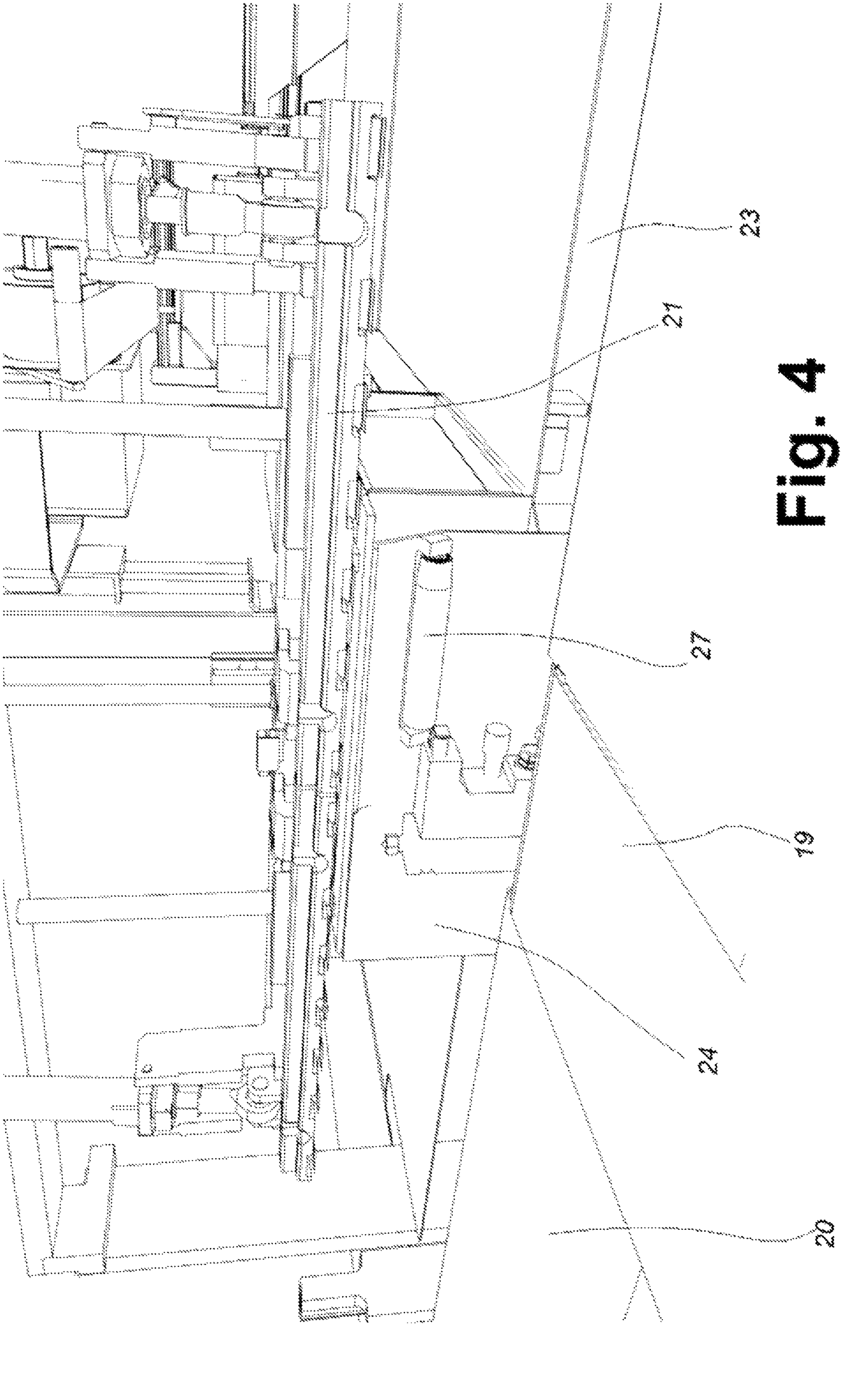
FIG. 4 shows, schematically, a further view of the closing station with the first folding and glue application means processing the carton.

The transverse opening allows entry of the first folding means 24 during the stages in which these do not engage with the carton, and the first means can leave the first movable sliding surface 20 through this opening, in order to process the carton, as shown in FIG. 4. For the production of the folding station, all the solutions described in EP 3 464 074 B1 may be adopted. The present invention, according to one aspect thereof, may differ from that described in this document solely in terms of the features specified below.

Instead of being fixed with respect to the rest of the machinery, the first movable sliding surface 20 is designed to travel in the same feed direction as the carton, as shown in the figures with arrow A.

This may be parallel to a surface of the machine 26 and facing downwards through the window made in the machine's surface, the said window having the sides denoted 25, essentially lending continuity to the surface, while also allowing the closing station to travel. The first sliding surface may be mounted on an undercarriage which is moved inside the machine in a commonly known way (via motors and electric transmissions, hydraulic or pneumatic cylinders, or other methods). The opening 23 is integral with the first sliding surface, as are all the structures of the folding station, and the said surface can move between a first position, in the direction of the origin of the cartons, carried by the conveyor belt 19, and a second position, in the direction where the cartons leave the folding station. While the conveyor belt can continue to travel uninterruptedly in the feed direction, the folding station in the first position receives the carton and secures it with the stop means 22, essentially in the manner described in EP 3 464 074 B1. The first sliding surface travels at the same speed as the conveyor belt 19 which moves the carton 18 in the same direction, remaining mutually stationary with the belt, during all the closing stages, which comprise the first folding means leaving via the opening 23, the side wall of the carton being lifted, the glue being applied by means 27 in FIG. 4, and the closing flap of the carton being closed by the second folding means. Once these procedures are complete, the carton is released by the folding and stopping means, the first folding means retract through the opening 23 underneath the first sliding surface and the latter can travel from the second position (which it had reached by travelling in the carton feed direction) to the first position, where it can receive another carton to be closed. Meanwhile, the carton just closed can continue to travel towards further processing stages or until it leaves the machine.

A further difference with respect to document EP 3 464 074 B1 is that, since the cartons no longer need to stop moving, a different solution can be adopted regarding the conveyor, which no longer requires sections, since it preferably moves the cartons at a constant speed throughout all the stages. For example, the same conveyor belt 18 can be used upstream and downstream of the closing station. To get past the opening 23, the belt can enter by means of the end return rollers 28. It can be made to run underneath the first movable sliding surface 20 and underneath all the support and movement structures of the first closing means, by means of one or more tensioning rollers supported integrally to the mobile sliding surface, in particular to the undercarriage supporting the said surface. This way, while the first movable sliding surface translates towards the second position, the conveyor belt is mutually stationary with it, while the surface is free to travel towards or remain mutually stationary with the machine, allowing the belt to continue its motion without interference.

Other solutions are also possible, for example two different conveyor belt sections. In this case, the travel of the first movable sliding surface must be considered and the belt allowed to cover different lengths over the machines surface and the sliding surface. For example, it will be necessary to provide tensioning systems, generally below the first movable sliding surface or the machine, such as movable rollers or other systems. This solution, if desired, can also allow the carton speed to be altered, for example, according to the dimensions.

Figure 3:
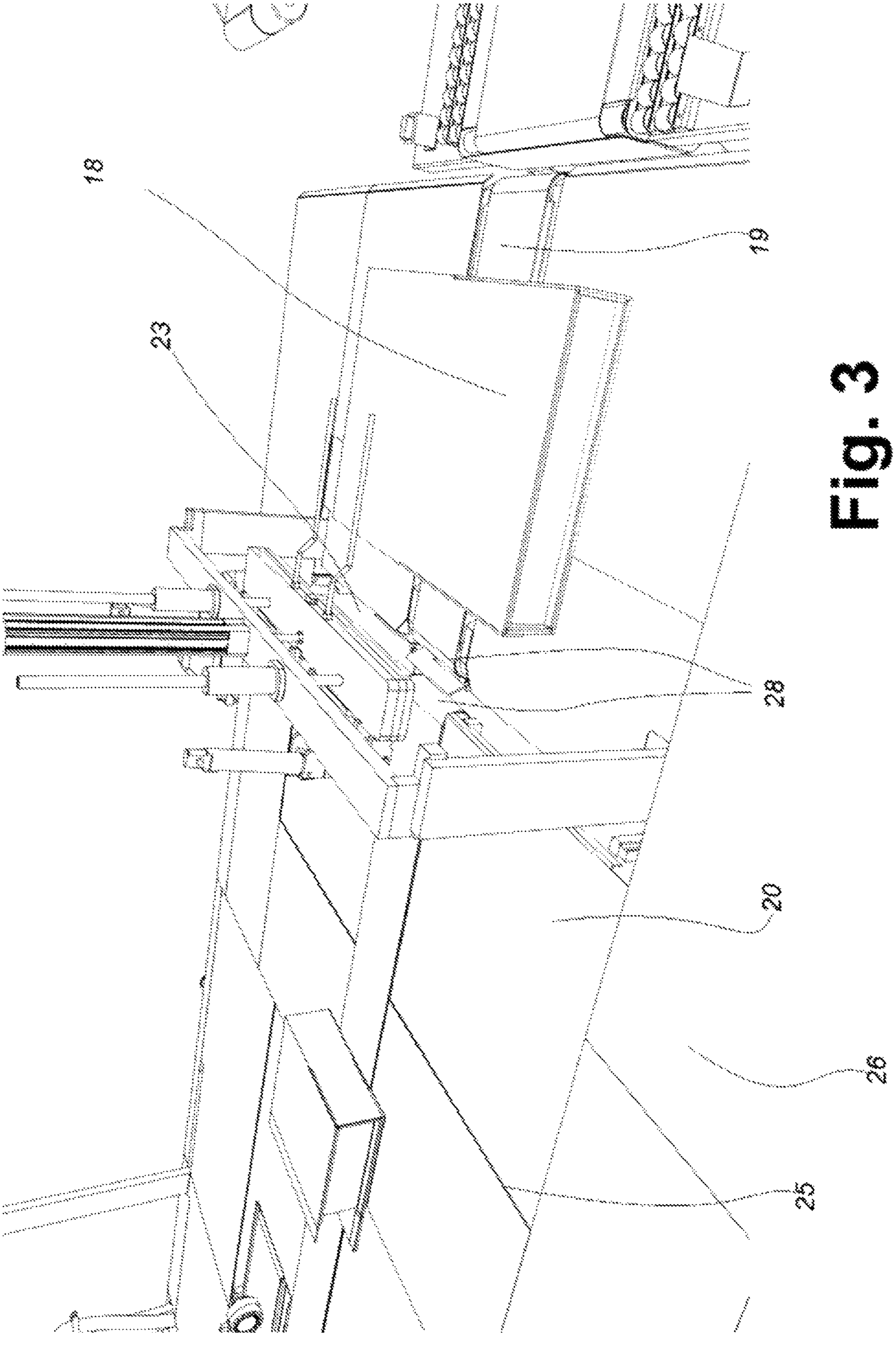
FIG. 3 shows, schematically, the closing station after the release of the closed carton.

According to one aspect of the invention, upstream of the closing station, the machine has a folding station with a folding zone as specified above. It can be produced in the same was as the second folding zone described in EP 3 464 086 A1 except for the fact that it is mounted integrally to a second movable sliding surface. As can be seen in FIGS. 2 and 3, the second folding zone 30 features the third folding means 32, shown only in part. It is integral with the second movable sliding surface 31, which—from the surface of the machinery 26—can be facing the first sliding surface in a similar way. In this case, contrary to the prior art, the said conveyor unit, and in particular the conveyor belt 19, can run across the folding zone, which travels at the same speed as the belt while the carton is engaged with the folding means and is then brought back to the starting end, as soon as the carton is released, to repeat the processing.

The invention claimed is:

1. Machinery for packaging articles in pre formed cartons, having a conveyor for making cartons to proceed with an article resting on top of the carton and partially enclosed by the carton, comprising:

- a station for closure including first folding means designed to lift a first side wall of said carton and arranged transversely to the carton progress direction up towards the article towards the rear of the article with respect to the carton progress direction,
- wherein said closure station is movable parallel to the carton progress direction and wherein said first folding means is movable parallel to the carton progress direction along with the closure station.

2. The machinery according to claim 1, wherein the closing station further comprises means of applying adhesive to said side wall coupled with the first folding means.

3. The machinery according to claim 1, wherein said closing station comprises second folding means designed to press a carton closing flap against the said side wall.

4. The machinery according to claim 1, further comprising a folding station having a folding zone comprising third folding means designed to lift a second side wall of the carton opposite the first and arranged in front of the article with respect to the carton progress direction against the article and to fold an upper wall hinged onto the second side wall over the article, wherein said folding zone may be moved parallel to the carton progress direction.

5. The machinery according to claim 1, wherein said closure station is integral with a sliding surface which can be moved in said progress direction, parallel to a surface of the machinery on top of which the cartons proceed.

6. A method for packaging articles in cartons comprising the following steps:

- progressing of the cartons containing a partially enclosed article in a progress direction by means of a conveyor;
- gripping of the carton by folding means and, optionally, application of adhesive by a closing station;
- moving of the closing station along with the folding means during the gripping phase in the carton progress direction, so that the proceeding carton and the station along with the folding means are in a mutually stationary position;
- releasing of the closed carton by said folding means; and
- moving of the closing station in the opposite direction to the carton progress direction in order to bring the said station back to the original position.

* * * * *